US007707342B2

(12) United States Patent
Horisaki

(10) Patent No.: US 7,707,342 B2
(45) Date of Patent: Apr. 27, 2010

(54) METHOD AND APPARATUS FOR ARBITRATING ACCESS

(75) Inventor: Yasunobu Horisaki, Kawasaki (JP)

(73) Assignee: Fujitsu Microelectronics Limited, Yokohama (JP)

(*) Notice: Subject to any disclaimer, the term of this patent is extended or adjusted under 35 U.S.C. 154(b) by 170 days.

(21) Appl. No.: 11/826,599

(22) Filed: Jul. 17, 2007

(65) Prior Publication Data

US 2008/0059675 A1 Mar. 6, 2008

(30) Foreign Application Priority Data

Aug. 31, 2006 (JP) ............................. 2006-235509

(51) Int. Cl.
*G06F 12/00* (2006.01)
(52) U.S. Cl. .................. 710/244; 710/41; 710/113; 710/116; 710/240; 710/241
(58) Field of Classification Search ................. 710/244, 710/240, 241, 41, 113, 116; 370/357, 360
See application file for complete search history.

(56) References Cited

U.S. PATENT DOCUMENTS

| 4,809,164 | A | * | 2/1989 | Fuller ............................ 710/41 |
| 5,146,596 | A | * | 9/1992 | Whittaker et al. ............. 710/116 |
| 5,392,434 | A | * | 2/1995 | Bryant et al. ................. 710/244 |
| 5,564,062 | A | * | 10/1996 | Meaney et al. ............... 710/244 |
| 5,623,672 | A | * | 4/1997 | Popat ............................ 710/240 |
| 5,896,539 | A | * | 4/1999 | Arimilli et al. ................ 710/244 |
| 6,389,012 | B1 | * | 5/2002 | Yamada et al. ............... 370/357 |
| 6,615,291 | B1 | * | 9/2003 | Kamei et al. .................. 710/22 |
| 6,618,778 | B1 | * | 9/2003 | MacCormack ............... 710/244 |
| 6,633,939 | B2 | * | 10/2003 | Butta' et al. ................. 710/244 |
| 6,862,630 | B1 | * | 3/2005 | Garg et al. ................... 709/250 |
| 7,254,661 | B2 | * | 8/2007 | Chae ............................ 710/116 |

(Continued)

FOREIGN PATENT DOCUMENTS

JP   11-039255 A   2/1999

(Continued)

OTHER PUBLICATIONS

Olesinski et al. Low-Latency Scheduling in Large Switches. ACM. 2007.*

(Continued)

*Primary Examiner*—Clifford H Knoll
*Assistant Examiner*—Matthew D Spittle
(74) *Attorney, Agent, or Firm*—Arent Fox LLP

(57) ABSTRACT

When four access request origins A, B, C, and D are present, a priority table (No. 1) having a priority order of A, B, C, and D, a priority table (No. 2) having a priority order of B, D, A, and C, a priority table (No. 3) having a priority order of C, A, D, and B, and a priority table (No. 4) having a priority order of D, C, B, and A are prepared. An order of employing these tables is determined in advance in this order. A priority table next in the order to the priority table employed in last arbitration or, when a priority table at the bottom in the order is employed in last arbitration, a priority table at the top in the order is employed. Based on the priority levels defined in the employed priority table, an access request to be accepted is selected.

9 Claims, 4 Drawing Sheets

U.S. PATENT DOCUMENTS 7,299,311 B1 * 11/2007 Sepeda et al. ............... 710/116
7,350,004 B2 * 3/2008 Fukuyama et al. .......... 710/241

FOREIGN PATENT DOCUMENTS

JP  2002-197050 A  7/2002
JP  2003-271545 A  9/2003

OTHER PUBLICATIONS

Gupta et al. On Chip Communication-Architecture Based Thermal Management for SoCs. IEEE. 2009.*

Texas Instruments. TMS320DM355 Digital Media System-on-Chip (DMSoC) ARM Subsystem. User's Guide. Sep. 2007.*

* cited by examiner

FIG.3

| PRIORITY TABLE NO. | PRIORITY RANK (DESCENDING FROM LEFT TO RIGHT) | |
|---|---|---|
| 1 | A, B, C, D | ~21 |
| 2 | B, D, A, C | ~22 |
| 3 | C, A, D, B | ~23 |
| 4 | D, C, B, A | ~24 |

FIG.4

| PRIORITY TABLE NO. | PRIORITY RANK (DESCENDING FROM LEFT TO RIGHT) | |
|---|---|---|
| 1 | A, B, C | ~31 |
| 2 | B, C, A | ~32 |
| 3 | C, A, B | ~33 |
| 4 | A, C, B | ~34 |
| 5 | B, A, C | ~35 |
| 6 | C, B, A | ~36 |

METHOD AND APPARATUS FOR ARBITRATING ACCESS

CROSS-REFERENCE TO RELATED APPLICATIONS

This application is based upon and claims the benefit of priority from the prior Japanese Patent Application No. 2006-235509, filed on Aug. 31, 2006, the entire contents of which are incorporated herein by reference.

BACKGROUND OF THE INVENTION

1. Field of the Invention

The present invention relates to a method and apparatus for arbitrating access to a common resource when access requests are issued from a plurality of origins.

2. Description of the Related Art

Conventionally, in a computer, when access requests such as those for reading and writing are issued from a plurality of blocks (access request origins) to a common resource such as a dynamic random access memory (DRAM), it is necessary to execute arbitration to the access requests. There has conventionally been an apparatus that executes such arbitration. The apparatus is configured to prevent the arbitration result from being unbalanced by counting the number of times of request acceptance for each of access request origins to control such that the counted numbers are equalized among the access request origins, or by a round-robin scheme.

For example, a bus arbiter apparatus is known that includes a group setting unit that makes settings by assigning each of a plurality of modules to any one of a plurality of arbitrating groups, an in-group arbitrating unit that arbitrates bus accesses to a common bus for each of the arbitrating groups, an intra-group arbitrating unit that arbitrates bus accesses to a common bus among the arbitrating groups, and a bus-use permission signal generating unit that provides a bus use permission signal to a module arbitrated by the intra-group arbitrating unit (for example, Japanese Patent Application Laid-Open Publication No. 2003-271545).

Moreover, such a bus arbiter apparatus is also known that includes a unit that groups request origins each of which needs to maintain the time from the issuance of a bus use request to the bus use permission to be short and request origins of requests other than requests for refreshing the DRAM as one group and regards the group as one request origin; a unit that, representing the lowest priority as the request of a group and the request having a priority higher by one level than the lowest priority as the request of refreshing in the initial state, changes, when a request origin for a request that is not the request of the group and not the request of refreshing has received bus use permission, the priority level of the request origin that has received the bus use permission to the lowest rank and, when the request of the group or the request of refreshing has received bus use permission, changes the lowest rank request of the priority to the request of the group and the request having the higher priority by one level than the lowest rank to the request of refreshing; and a unit that issues bus use permission in response to a bus use request of a request origin based on the priority levels changed by the above unit (for example, Japanese Patent Application Laid-Open Publication No. H11-39255).

Furthermore, such a arbitration control system is also known that includes a plurality of requesters that transmit use requests for a common resource retained commonly among a plurality of apparatuses; a control unit that receives the use requests and transmits the received use request at a predetermined frequency having been set to the requesters that have transmitted the use requests; and a arbitrating unit that arbitrates by selecting requesters to permit the use of the common resources according to the received use requests (for example, Japanese Patent Application Laid-Open Publication No. 2002-197050).

However, in the above conventional methods in which the number of times of request acceptance is counted, a counter is necessary for each of the access request origins. Therefore, the circuit scale of the arbiter apparatus tends to be large.

SUMMARY OF THE INVENTION

It is an object of the present invention to at least solve the above problems in the conventional technologies.

An access arbiter apparatus according to one aspect of the present invention arbitrates access requests respectively issued from a plurality of request origins with respect to a common resource. The access arbiter apparatus includes a request checking unit that checks whether an access request signal is present; a plurality of priority tables that define priority levels of the request origins, the priority tables for which an order of employment is defined; a arbitration control unit that controls arbitration, when it is confirmed that a plurality of access request signals are present as a result of check by the request checking unit, by determining, for each access request, whether the access request is to be accepted based on the priority tables; and a response signal issuing unit that issues a response signal to a request origin of which the access request has been determined to be accepted by the arbitration control unit. The arbitration control unit employs, among the priority tables, a priority table next in the order to a previous priority table that is employed in last arbitration, and determines whether to accept each of the access requests based on priority levels defined in the employed priority table.

An access arbitrating method according to another aspect of the present invention is of arbitrating access requests issued respectively from a plurality of request origins to a common resource. The access arbitrating method includes selecting a priority table from among a plurality of priority tables each of which defines priority levels for the request origins, the priority tables for which an order of employment is defined; and selecting an access request to be accepted based on the selected priority table. The selecting includes selecting any one of a priority table next in the order to a previous priority table that is employed in last arbitration and a priority table at the top in the order, and the priority table at the top in the order is selected when the previous priority table is a priority table at the bottom in the order.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 3 is a priority table when the number of access request origins is four;

FIG. 4 is a priority table when the number of access request origins is three.

DETAILED DESCRIPTION OF THE PREFERRED EMBODIMENTS

Exemplary embodiments according to the present invention will be explained in detail below with reference to the accompanying drawings.

Figure 1:
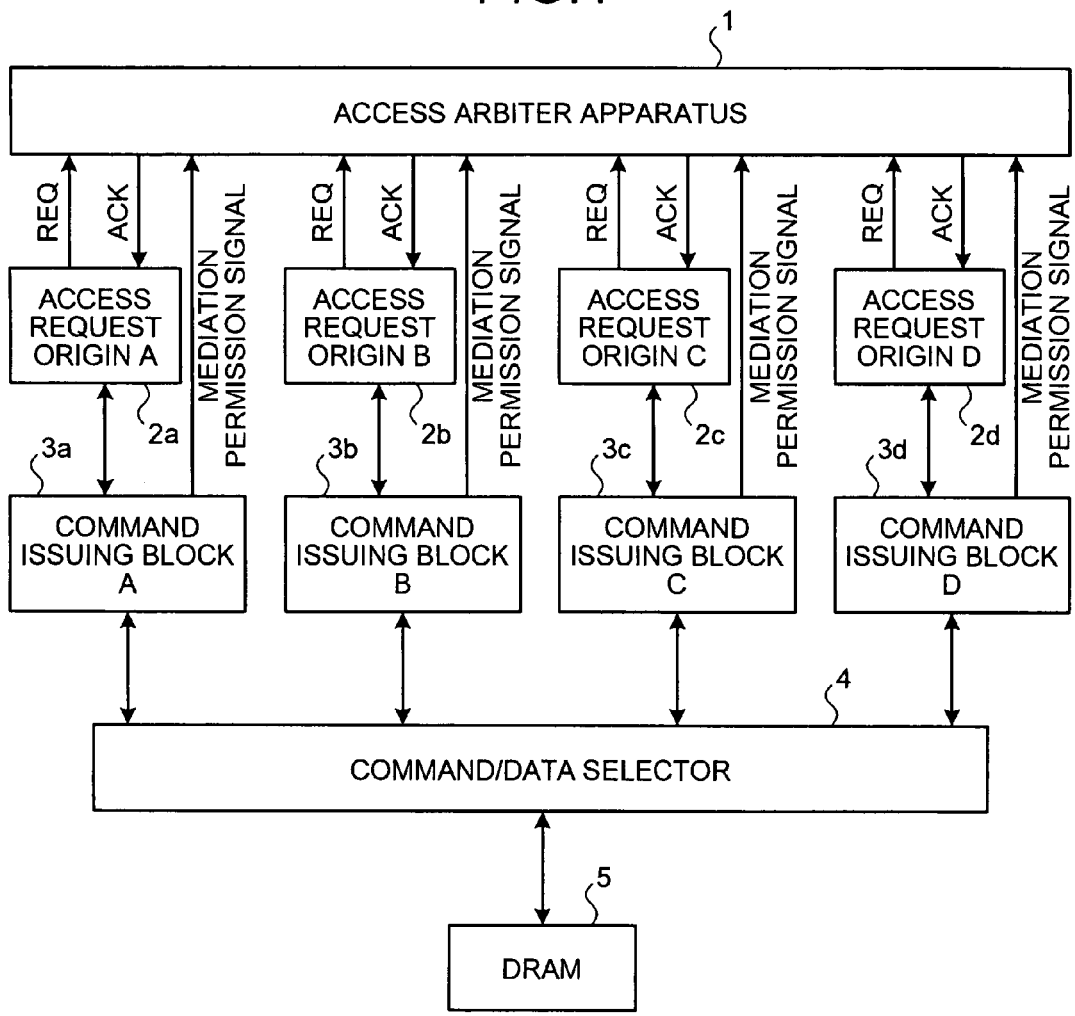
FIG. 1 is a block diagram of a configuration including an access arbiter apparatus according to an embodiment of the present invention.

FIG. 1 is a block diagram of a configuration including an access arbiter apparatus according to an embodiment of the present invention. Although not specifically limited, description will be given herein for the case where an even-numbered access request origins, for example, four access request origins are present.

As shown in FIG. 1, a computer includes an access arbiter apparatus 1 according to the embodiment, four access request origins (A 2a, B 2b, C 2c, and D 2d), four command issuing blocks (A 3a, B 3b, C 3c, and D 3d), a command/data selector 4, and a DRAM 5 that is a common resource. The access request origin A 2a outputs an access request signal REQ to the access arbiter apparatus 1 when the origin A 2a reads or writes data from/into the DRAM 5.

The access request origin A 2a receives an ACK from the access arbiter apparatus 1 when the access request for the DRAM 5 is accepted. The "ACK" is a response signal indicating that the access arbiter apparatus 1 has accepted the access request. The command issuing block A 3a issues a read command or a write command according to the contents of the access request of the access request origin A 2a for the DRAM 5. The command issuing block A 3a outputs a arbitration permission signal to the access arbiter apparatus 1.

Same procedures are taken respectively for the access request origin B 2b, the access request origin C 2c, and the access request origin D 2d, and the command issuing block B 3b, the command issuing block C 3c, and the command issuing block D 3d that respectively correspond to the origins. The access arbiter apparatus 1 receives access request signals REQ outputted respectively from the access request origin A 2a, the access request origin B 2b, the access request origin C 2c, and the access request origin D 2d and, when arbitration permission signals respectively for the access request signals REQ have been issued, executes arbitration, and selects the access requests to be accepted. The access arbiter apparatus 1 returns ACKs to the access request origins that have issued the access requests accepted.

The command/data selector 4 selects an output origin or an output destination of a command and data between: the command issuing block A 3a, the command issuing block B 3b, the command issuing block C 3c, and the command issuing block D 3d; and the DRAM 5. When the computer of the embodiment is, for example, a digital camera, the DRAM 5 stores moving image data, sound data, and still image data.

Figure 2:
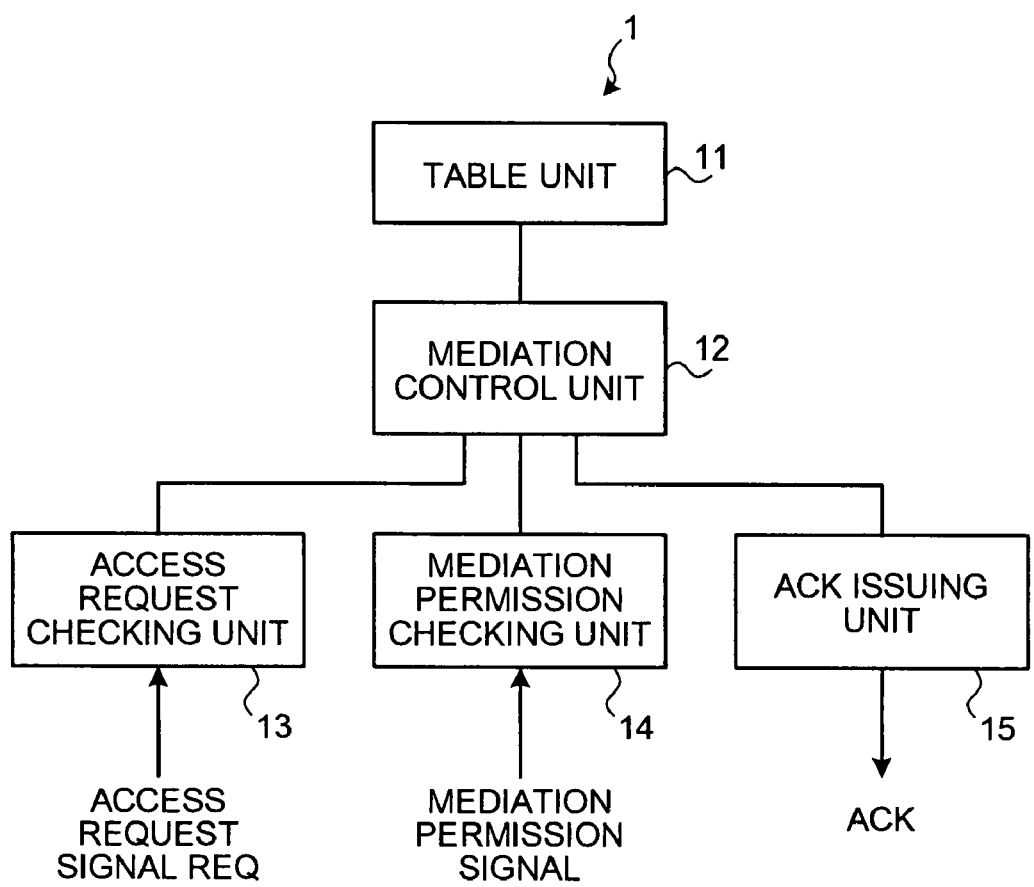
FIG. 2 is a block diagram of the access arbiter apparatus.

FIG. 2 is a block diagram of the access arbiter apparatus. As shown in FIG. 2, the access arbiter apparatus 1 includes a table unit 11 having a plurality of priority tables, a arbitration control unit 12, an access request checking unit 13, a arbitration permission checking unit 14, and an ACK issuing unit 15.

The table unit 11 has a plurality of priority tables that define priority levels of the access request origins. Order of employing the priority tables is determined in advance. By making the table unit 11 rewritable, deviation can be intentionally generated in the arbitration result.

When access requests are issued from the access request origins for the DRAM 5, the arbitration control unit 12 refers to the priority tables in the table unit 11, accepts the access request for the access request origin having the highest priority, and rejects other access requests. At this time, the arbitration control unit 12 employs a priority table next to the priority table employed in last arbitration. When the priority table employed in last arbitration was the priority table at the tail, the priority table at the head is employed.

The access request checking unit 13 checks the presence or absence of an access request signal REQ and notifies the arbitration control unit 12 of information on the issuer of the access request signal REQ. The arbitration permission checking unit 14 checks the presence or absence of a arbitration permission signal and notifies the arbitration control unit 12 of information of the issuer of the arbitration permission signal. The ACK issuing unit 15 issues an ACK to the access request origin for which the access request thereof has been accepted by the arbitration control unit 12.

In this case, when the number of access request origins is an even number, the same number of priority tables as that of the access request origins are prepared. FIG. 3 depicts a priority table employed when the number of access request origins is four. As shown in FIG. 3, the priority of each of the access request origins descends in an order of A, B, C, and D in a priority table 21 of No. 1. The priority of each of the access request origins descends in an order of B, D, A, and C in a priority table 22 of No. 2. The priority of each of the access request origins descends in an order of C, A, D, and B in a priority table 23 of No. 3. The priority of each of the access request origins descends in an order of D, C, B, and A in a priority table 24 of No. 4.

Among these four priority tables 21, 22, 23, and 24, a priority table is employed in an order of, for example, No. 1, No. 2, No. 3, and No. 4. For the entirety formed by integrating all the four priority tables 21, 22, 23, and 24, any of the access request origins has a rate of 50% of the priority rates thereof that are higher than those of other access request origins and also has a rate of 50% of the priority rates thereof that are lower than those of other access request origins.

Noting, for example, the access request origin A 2a and the access request origin B 2b, though the priority of the access request origin A 2a is higher in the priority table 21 for No. 1 and the priority table 23 for No. 3, the priority of the access request origin B 2b is higher in the priority table 22 for No. 2 and the priority table 24 for No. 4. The same result will be obtained for each combination of two of other access request origins.

When the number of access request origins is an odd number, priority tables twice as many as the access request origins are prepared. This is because, for the entirety formed by integrating all the priority tables, similarly to the case where the number of access request origins is an even number, access priority tables twice as many as the access request origins are necessary for any of the access request origins to have the rate of 50% of the priority rates thereof that are higher than those of other access request origins and to also have a rate of 50% of the priority rates thereof that are lower than those of other access request origins. In this manner, when the number of the access request origins is an odd number, the number of necessary priority tables is increased. However, the configuration of each of the tables is simple and, therefore, the circuit scale can be minimized.

FIG. 4 depicts an example of a priority table employed when the number of access request origins is three. As shown in FIG. 4, the priority of each of the access request origins descends in an order of A, B, and C in a priority table 31 if No. 1. The priority of each of the access request origins descends in an order of B, C, and A in a priority table 32 of No. 2. The priority of each of the access request origins descends in an order of C, A, and B in a priority table 33 of No. 3.

The priority of each of the access request origins descends in an order of A, C, and B in a priority table 34 of No. 4. The priority of each of the access request origins descends in an order of B, A, and C in a priority table 35 of No. 5. The priority of each of the access request origins descends in an order of C, B, and A in a priority table 36 of No. 6. These six priority tables 31, 32, 33, 34, 35, and 36 are employed in an order of, for example, No. 1, No. 2, No. 3, No. 4, No. 5, and No. 6.

Figure 5:
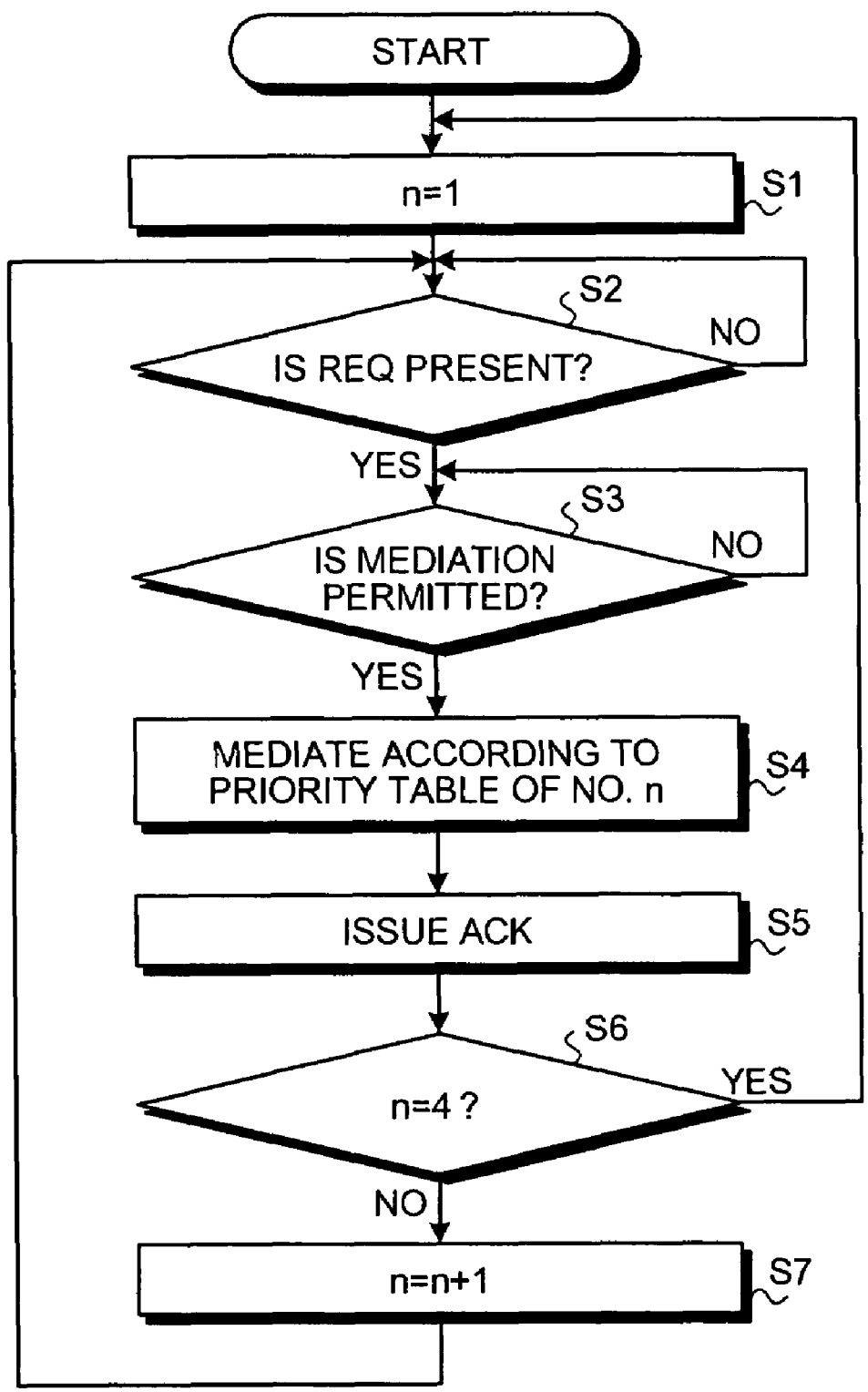
FIG. 5 is a flowchart of a process performed by the access arbiter apparatus.

The number of the access request origins is assumed to be four. FIG. 5 is a flowchart of a process performed by the access arbiter apparatus. As shown in FIG. 5, after resetting, a value n (n is a positive integer) to identify a priority table is set at one by the arbitration control unit 12 (step S1). In this state, an access request signal REQ is waited for to be issued from any one of access request origins.

Whether the access request signal REQ is present or absent is checked (step S2). When the access request signal REQ is absent (step S2: NO), the signal REQ is continuously waited for. When the access request signal REQ is present (step S2: YES), whether a arbitration permission signal is present or absent is checked by the arbitration permission checking unit 14. Whether arbitration is permitted is judged by the arbitration control unit 12 (step S3). When the arbitration is not permitted (step S3: NO), the permission is continuously waited for.

When the arbitration is permitted (step S3: YES), the arbitration is executed by the arbitration control unit 12 using No. n, that is the priority table 21 for No. 1 in the table unit 11 (step S4). As a result, an access request of the access request origin of the highest priority (in the example of FIG. 3, the access request origin A 2a) in the priority table 21 of No. 1 is accepted. The ACK issuing unit 15 issues an ACK to the access request origin of which the access request has been accepted (in the example of FIG. 3, the access request origin A 2a) (step S5).

The arbitration control unit 12 judges whether n is four (step S6). In this case, because n is not four (step S6: NO), one is added to n (step S7) and the procedure is returned to step S2. Whether the access request signal REQ is present or absent and whether the arbitration is permitted are again checked (steps S2 and S3). When the access request signal REQ is present and the arbitration is permitted (steps S2 and S3: YES), the arbitration control unit 12 executes the arbitration using the priority table 22 of No. 2 in the table unit 11 (step S4).

After this, the arbitration is executed similarly using sequentially the priority table 23 of No. 3 and the priority table 24 of No. 4. In the case of "YES" at step S6, that is, when the arbitration is executed using the priority table 24 of No. 4, the procedure is returned to step S1 and, in the next arbitration, the priority table 21 of No. 1 is used. When the number of access request origins is three and in the example shown in FIG. 4, the priority tables are employed in the order of No. 1, No. 2, No. 3, No. 4, No. 5, and No. 6 and the priority table 31 of No. 1 is used following the priority table 36 of No. 6.

As described above, according to the embodiment, for the entirety, the priority levels of each of the access request origins are defined such that any access request origin has the same rate for which the origin has a higher priority level than other access request origins as the rate for which the origin has a lower priority level than other access request origins, and each priority table is sequentially selected. Therefore, impartial arbitration result can be obtained. Each priority table has a simple configuration because values n to identify the table and access request origins are arranged therein in a descending order of priority level. Therefore, impartial arbitration can be executed with a simple configuration. In addition, impartial arbitration can be executed with ease.

In the above, the present invention is not limited to the above embodiment and can be variously modified. For example, the common resource is not limited to a DRAM and two or more common resources may be present. The number of access request origins is not limited to three or four and two or five or more may be similarly employed.

According to the embodiment described above, impartial arbitration can be executed with a simple configuration and with ease.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An access arbiter apparatus that arbitrates access requests respectively issued from a plurality of request origins with respect to a common resource, comprising:
    a request checking unit that checks whether an access request signal is present;
    a plurality of priority tables that define priority levels of the request origins, the priority tables for which an order of employment is defined;
    a arbitration control unit that controls arbitration, when a plurality of access request signals are present, determines for each access request, whether the access request is to be accepted based on the priority tables; and
    a response signal issuing unit that issues a response signal to a request origin of which the access request has been determined to be accepted by the arbitration control unit,
    wherein the arbitration control unit employs, among the priority tables, a priority table next to a previous priority table that is employed in last arbitration, and determines whether to accept each of the access requests based on priority levels defined in the employed priority table,
    wherein a number of the plurality of priority tables is set to equal to a number of the plurality of request origins when the number of the plurality of request origins is even, and the number of the plurality of priority tables is set to twice the number of the plurality of request origins when the number of the plurality of request origins is odd, and
    wherein the priority level of each of the request origins is defined such that a rate of a higher priority level of each of the request origins is substantially equal for each of the request origins, and a rate of a lower priority level of each of the request origins is substantially equal for each of the request origins.

2. The access arbiter apparatus according to claim 1, wherein the arbitration control unit employs, among the priority tables, a priority table at the top in the order, when the previous priority table is a priority table at the bottom in the order.

3. The access arbiter apparatus according to claim 1, wherein the plurality of request origins includes A, B, C, and D, and
    wherein the plurality of priority tables includes a priority table having a priority order of A, B, C, and D, a priority table having a priority order of B, D, A, and C, a priority table having a priority order of C, A, D, and B, a priority table having a priority order of D, C, B, and A.

4. The access arbiter apparatus according to claim 1, wherein the plurality of request origins includes A, B, and C, and
    wherein the plurality of priority tables includes a priority table having a priority order of A, B, and C, a priority table having a priority order of B, C, and A, a priority table having a priority order of C, A, and B, a priority table having a priority order of A, C, and B, a priority table having a priority order of B, A, and C, and a priority table having a priority order of C, B, and A.

5. The access arbiter apparatus according to claim 1, further comprising a arbitration permission checking unit that checks, for the access request signal, whether arbitration is possible based on a arbitration permission signal externally input.

6. An access arbitrating method of arbitrating access requests issued respectively from a plurality of request origins to a common resource, comprising:

selecting a priority table from among a plurality of priority tables each of which defines priority levels for the request origins, the priority tables for which an order of employment is defined;

selecting an access request to be accepted based on the selected priority table;

selecting, among the plurality of priority tables, a next priority table to a previous priority table that is employed in last arbitration and a priority table at the top in the order; and selecting a top priority table out of the plurality of priority tables when the previous priority table is a bottom priority table out of the plurality of priority tables, wherein a number of the plurality of priority tables is set to equal to a number of the plurality of request origins when the number of the plurality of request origins is even, and the number of the plurality of priority tables is set to twice the number of the plurality of request origins when the number of the plurality of request origins is odd, and wherein the priority level of each of the request origins is defined such that a rate of a higher priority level of each of the request origins is substantially equal for each of the request origins, and a rate of a lower priority level of each of the request origins is substantially equal for each of the request origins.

7. The access arbiter apparatus according to claim 6, wherein the plurality of request origins includes A, B, C, and D, and wherein the plurality of priority tables includes a priority table having a priority order of A, B, C, and D, a priority table having a priority order of B, D, A, and C, a priority table having a priority order of C, A, D, and B, a priority table having a priority order of D, C, B, and A.

8. The access arbiter apparatus according to claim 6, wherein the number of priority tables is twice as many as odd-numbered request origins, and the priority level of each of the request origins is defined such that each of the request origins has equal rates of having a higher priority level than other request origins and having a lower priority level than other request origins, for whole of all of the priority tables.

9. The access arbiter apparatus according to claim 8, wherein the plurality of request origins includes A, B, and C, and wherein the plurality of priority tables includes a priority table having a priority order of A, B, and C, a priority table having a priority order of B, C, and A, a priority table having a priority order of C, A, and B, a priority table having a priority order of A, C, and B, a priority table having a priority order of B, A, and C, and a priority table having a priority order of C, B, and A.

* * * * *